United States Patent Office 2,759,969
Patented Aug. 21, 1956

2,759,969
RECOVERY OF PERCHLOROMETHYL MERCAPTAN

Heinz Jonas, Leverkusen-Wiesdorf, Germany, assignor to Farbenfabriken Bayer Aktiengesellschaft, Leverkusen, Germany, a corporation of Germany No Drawing. Application June 10, 1953, Serial No. 360,834

Claims priority, application Germany June 28, 1952

4 Claims. (Cl. 260—543)

The present invention relates to a new and improved process of producing perchloromethyl mercaptan.

Perchloromethyl mercaptan ($CCl_3SCl$) is produced by chlorinating carbon disulfide, preferably in the presence of iodine whereupon perchloromethyl mercaptan is produced in admixture with sulfur monochloride or sulfur dichloride. In performing the process chlorine is added to carbon disulfide in quantities stoichiometrically corresponding to these sulfur chlorides. Finally the reaction products are separated. Separation cannot be accomplished by distillation because the boiling points of perchloromethyl mercaptan and sulfur monochloride are substantially identical. The sulfur chlorides are therefore decomposed with water, and the perchloromethyl mercaptan is distilled off by means of steam. Sulfur precipitates during this operation; it is obtained in the form of a more or less coherent solid clot. The difficulties involved in distillation are such that special conditions have to be applied to obtain approximately fair yields even when working on a small, non-technical scale. In the large scale production of perchloromethyl mercaptan the yields are limited to such an extent that the process is uneconomic. The drawbacks associated with the precipitating sulfur prevent the continuous performance of the process, which would be highly desired to minimize the losses of material.

It is an object of the invention to provide a new and convenient process for the recovery of perchloromethyl mercaptan from the reaction mixture of carbon disulfide and chlorine, which consists substantially of perchloromethyl percaptan and sulfur chloride compounds.

Further objects of the invention will become apparent as the following description proceeds.

The objects of the invention are accomplished by subjecting the reaction mixture of carbon disulfide and chlorine in the cold, for instance from 0–10° C., with an aqueous solution of sulfur dioxide or neutral or acid sulfites, especially of alkali metals or alkaline earth metals; in this process, the temperature is prevented from rising above about +10° C. by cooling. The salts of alkali metals and, among them, the sodium salts, i. e. sodium sulfite and sodium bisulfite and pyrosulfite, are excellently suitable for the recovery of perchloromethyl mercaptan according to the invention. The sulfur chloride compounds react with the aqueous sulfite solutions with the formation of salts, for instance polythionates, thiosulfate and chloride, whilst they are dissolved from the non-aqueous phase to give a clear solution in the aqueous phase without elementary sulfur precipitating during the reaction. Besides the sodium salts, also the sulfites of alkaline earth metals, especially those of calcium and magnesium, may be employed; furthermore, an aqueous solution of sulfur dioxide. In view of the lower solubility of sulfur dioxide in water it is of advantage to saturate continuously the aqueous solution with the gas while stirring. It has proved to be expedient to acidify the solutions of the said salts, as far as they react alkaline, to a pH of about 5–6.

It is a surprising feature of the invention that perchloromethyl mercaptan is neither hydrolysed nor reduced by the aqueous solutions under the herein described reaction conditions. This is worthy of note since it is known from "Annalen der Chemie" vol. 161, pages 129 seq. and from "Recuil des Travaux Chimiques des Pays-Bas," vol. 49 (1930), pages 1048 seq., especially 1050, that the reaction of perchloromethyl mercaptan when introduced into a cold, concentrated aqueous solution of neutral potassium sulfite to form the potassium salt of methyl mercaptotrisulfonic acid, proceeds with intense self heating to such a degree that cooling means have to be applied. When working according to the invention and preventing the temperature from rising above about +10° C. the sulfur chloride compounds are decomposed only whereas perchloromethyl mercaptan is substantially unaffected and can be isolated in a good yield and high grade purity.

The oil remaining behind after extraction of the chlorination mixtures with the sulfite solutions consists of perchloromethyl mercaptan substantially free of sulfur chloride, which is associated with low quantities of compounds which can be separated in a subsequent distillation without difficulty. Perchloromethyl mercaptan is obtained after distillation in a very pure, yellow colored condition in a high grade quality which could not be obtained by any conventional method.

Perchloromethyl mercaptan is a valuable intermediate product for instance in the production of dyestuffs, insecticides and pharmaceutical products.

The invention is further illustrated by the following examples without being restricted thereto:

Example 1

A saturated solution of 300 grams of sodium sulfite in water is acidified with hydrochloric acid to pH 5 and stirred with about 600 grams of ice. The reaction mixture of 76 grams of carbon disulfide and 165 grams of chlorine is introduced rapidly with further stirring. Care is taken that the temperature does not exceed about +10° C., which, if necessary, is achieved by addition of further quantities of ice. After about 15 minutes the oil is allowed to settle and separate from the aqueous solution. In steam distillation the oil goes over except a few drops. The purification of the oil by redistillation in vacuo shows that the reaction product consists of almost pure perchloromethyl mercaptan after removing a smaller forerun. The yield corresponds to about 80% of the theoretical.

Example 2

The reaction mixture of 76 grams of carbon disulfide and 178 grams of chlorine is introduced into 600 cc. of a 35% solution of sodium bisulfite with stirring, as described in Example 1, the temperature being kept at +10° C. by addition of ice or by external cooling by means of a freezing mixture. The oil settling after stirring for 15 minutes yields perchloromethyl mercaptan by distillation in a yield of about 85% of the theoretical.

Instead of the sodium bisulfite solution, appropriately lower quantities of sodium bisulfite and neutral sulfite may also be used in combination. In this case, the neutral sulfite is added gradually to the solution of sodium bisulfite with the introduction of the chlorination mixture. Instead of 600 cc. of 35% sodium bisulfite solution, 200 cc. of this solution and, in addition, 200 grams of neutral sodium sulfite are employed.

Example 3

Sulfur dioxide is passed into a mixture of about 500 cc. of water and 500 grams of ice, and 254 grams of the chlorination mixture mentioned in Example 2 is simultaneously introduced. Perchloromethyl mercaptan is recovered from the reaction mixture in a yield of about 80% of the theoretical.

*Example 4*

A saturated solution of 400 grams of calcium bisulfite is stirred with ice cooling at about 0–10° C., as described in the preceding examples, with 256 grams of crude perchloromethyl mercaptan. Pure perchloromethyl mercaptan is recovered from the reaction mixture in a yield of about 90%.

I claim:

1. In the process of recovering perchloromethyl mercaptan from a mixture of perchloromethyl mercaptan and at least one sulfur chloride the step which comprises mixing the mixture with an aqueous solution containing a compound of the group consisting of an aqueous sulfurous acid and water soluble salts thereof at a temperature below about +10° C.

2. In the process of recovering perchloromethyl mercaptan from a mixture of perchloromethyl mercaptan and at least one sulfur chloride the step which comprises mixing the mixture with an aqueous solution containing a compound of the group consisting of an aqueous sulfurous acid and water soluble salts thereof at a temperature below about +10° C., separating the oily layer from the aqueous layer and distilling the oil.

3. In the process of recovering perchloromethyl mercaptan from a mixture of perchloromethyl mercaptan and at least one sulfur chloride the step which comprises mixing the mixture with an aqueous solution containing a compound of the group consisting of an aqueous sulfurous acid and water soluble salts thereof at a temperature below about +10° C. at a pH of about 5–6.

4. In the process of recovering perchloromethyl mercaptan from a mixture of perchloromethyl mercaptan and at least one sulfur chloride the step which comprises mixing the mixture with an aqueous solution containing a compound of the group consisting of an aqueous sulfurous acid and water soluble salts thereof at a temperature below about +10° C., separating the oily layer from the aqueous layer and distilling the oil at a pH of about 5–6.

References Cited in the file of this patent

UNITED STATES PATENTS 2,664,442    Kamlet _____ Dec. 29, 1953